United States Patent [19]

Andrews et al.

[11] Patent Number: 4,975,301

[45] Date of Patent: Dec. 4, 1990

[54] GLASS COATING

[75] Inventors: Ray Andrews, Washington; James W. Kridler, Monroeville, both of Pa.

[73] Assignee: The O. Hommel Company, Pittsburgh, Pa.

[21] Appl. No.: 288,852

[22] Filed: Dec. 23, 1988

Related U.S. Application Data

[62] Division of Ser. No. 83,674, Aug. 7, 1987, abandoned.

[51] Int. Cl.$^5$ ............................................. C23C 26/00
[52] U.S. Cl. ................................. 427/126.2; 427/123; 427/125
[58] Field of Search ...................... 427/126.2, 123, 125

[56] References Cited

U.S. PATENT DOCUMENTS

| | | | |
|---|---|---|---|
| 2,508,511 | 5/1950 | Goodman | 427/126.2 |
| 3,075,860 | 1/1963 | Veres | 427/126.2 |
| 3,784,407 | 1/1974 | Shiio | 427/126.2 |
| 3,929,491 | 12/1975 | Smith | 427/125 |
| 3,944,696 | 3/1976 | Larry | 428/208 |
| 4,016,645 | 4/1977 | Cooke | 427/123 |
| 4,018,717 | 4/1977 | Francel et al. | 252/513 |
| 4,020,206 | 4/1977 | Beil | 427/125 |
| 4,043,824 | 8/1977 | Wagar | 106/48 |
| 4,122,232 | 10/1978 | Kuo | 427/123 |
| 4,140,817 | 2/1979 | Brown | 427/123 |
| 4,158,081 | 6/1979 | Wexell | 428/212 |
| 4,172,319 | 10/1979 | Bloom | 427/123 |
| 4,264,679 | 4/1981 | Panzarino et al. | 428/427 |
| 4,280,084 | 7/1981 | Graff | 106/48 |
| 4,353,991 | 10/1982 | Van Ness et al. | 501/20 |
| 4,567,059 | 1/1986 | Yamaoka | 427/126.2 |
| 4,684,388 | 8/1987 | Boaz | 65/24 |
| 4,684,389 | 8/1987 | Boaz | 65/24 |

FOREIGN PATENT DOCUMENTS 64211 11/1982 European Pat. Off. ............ 427/125

OTHER PUBLICATIONS

J. A. Stewart, B. F. Drakenfeld & Co., "Classification of Inorganic Enamels", Oct. 20–21, 1965, Society of Glass Decorators, pp. 16–17.
William Stevenson, "Functional Properties of Glass Enamels", SGCD 1985–1986 Seminar Proceedings 'Your Best Source', pp. 5–6.
E. E. Sailer et al., "Microelectronic Conductive Composition", IBM Technical Disclosure Bulletin, vol. 7, No. 11, Apr. 1965.

Primary Examiner—Shrive Beck
Assistant Examiner—Vi D. Dang
Attorney, Agent, or Firm—Webb, Burden, Ziesenheim & Webb

[57] ABSTRACT

A method of decorating a glass substrate that has conductive coating applied thereto as electrically resistive heating elements comprises applying to said glass substrate a glass enamel composition comprising 5 to 25 percent by weight glass coloring agents, 1 to 25 percent by weight of a metal that will be resistant to rapid oxidation under the conditions in which the glass enamel is fired, and the remainder a soda free flux glass. The conductive coating composition is next applied and comprises finely divided conductive noble metals including silver, and a glass binder. The glass enamel composition and the conductive coating composition are fired onto the substrate. The glass enamel and conductive coating do not visibly react and the conductive coating cannot be seen through the glass enamel.

6 Claims, No Drawings

GLASS COATING

This application is a division of application Ser. No. 083,674, filed Aug. 7, 1987, now abandoned.

BACKGROUND OF THE INVENTION

This invention relates to a glass enamel composition which is a composition that includes ceramic coloring agents and can be fired upon a glass substrate. Typically, the glass enamel composition is comprised of very finely divided oxides in a oil and resin carrier-binder that can be applied to the glass substrate by silk screening, rolling or painting.

For some years automobiles have been supplied with rear windows (called "backlites" in the automobile industry) printed with an electrically conductive glass-metal grid composed of vertical bus bars and very fine horizontal lines running across the window. The conductive glass-metal grid is, for example, applied by silk screening upon the window a composition comprising very fine silver powder and a finely ground soft lead glass dispersed in an oil and resin carrier. The windows are then heated to a temperature at which the soft lead glass melts and the silver grid is permanently fixed to the surface of the glass window.

In recent years, to improve the appearance of the backlites and to protect materials that secure the edges and the backlites from radiation, a dark grey or black border of glass enamel has been printed around the edge of the glass. In some cases, the conductive glass-metal coatings have been applied over the glass enamel. In other cases, the glass-metal coatings have been applied abutting the glass enamel border. When the conductive coating is applied over the grey or black glass enamel and after firing, it shows through as a discoloration. Where the conductive coating abuts the glass enamel border, an interaction between the two is visibly apparent. The interaction between the conductive coatings and the glass enamels, whether overlapping or abutting, is not only unsightly but appears to reduce the electrical conductivity of the conductive coating and appears to reduce the strength of solder connections between the coatings and electrical lead wires.

SUMMARY OF THE INVENTION

Briefly, according to this invention, there is provided a glass enamel composition comprising 5 to 25, preferably, 10 to 15 percent by weight glass coloring agents, 1 to 25 percent by weight of a metal that is resistant to rapid oxidation under the conditions in which the glass enamel is fired, and the remainder a soda free flux glass.

There is also provided according to this invention a method of decorating a glass substrate that has conductive glass-metal coating applied thereto as electrically resistive heating elements. The method comprises the step of applying to said glass substrate a glass enamel composition as above described. The glass enamel composition is then dried or ultraviolety cured. The method comprises the step of applying a conductive glass-metal coating composition to the substrate either abutting or overlapping the glass enamel composition previously applied. The conductive coating composition typically will comprise finely divided conductive metals (for example, silver and noble metals) and a glass binder. The conductive coating composition is then dried. Finally, the substrate bearing the glass enamel composition and the conductive coating composition is heated to temperatures at which the soda free flux glass in the glass enamel composition and the glass binder in the conductive composition soften and coalesce to cause the adherence of the glass enamel and the conductive coating upon the substrate. This heating step is referred to by those skilled in the art as "firing".

It is an advantage according to this invention that the glass enamel and conductive coating do not visibly react and the conductive coating cannot be seen through the glass enamel..after firing. It is yet another advantage that the glass enamel may exhibit excellent opacity.

There is still further provided, according to this invention, a glass substrate that has a conductive coating (an electrically resistive heating element) thereon and a fired glass enamel thereon. The glass enamel coating is prepared from a composition as above described. It is an advantage of this invention that where the conductive coating touches or overlaps the glass enamel, the glass enamel and conductive coating do not visibly react and the conductive coating cannot be seen through the glass enamel.

It is preferred for the inventions disclosed herein that the metal in the glass enamel composition is selected from the group consisting of zinc, tin, and manganese. By resistance to rapid oxidation, I do not mean to limit the scope of this invention to noble metals which can be heated in air without oxidation. In fact, the noble metals would not be used. Zinc, tin and manganese have been found to have sufficient resistance to rapid oxidation for the purposes of this invention. The cost of these metals makes them preferred. However, it is contemplated that other metals will also have sufficient resistance to rapid oxidation under the conditions in which the glass enamel is fired, for example, titanium, cadmium, chromium, iron, cobalt, and nickel. It is further contemplated that metal alloys (for example, stainless steel) and mixtures of metals will have sufficient resistance to rapid oxidation. Preferably, the metal all passes 325 mesh Tyler Series. Most preferably, the metal has an average particle size of less than one micron.

According to one embodiment of the inventions disclosed herein, the metal in the glass enamel composition is present in the amount 8 to 15 weight percent. Preferably, all ingredients pass 325 mesh Tyler Series. The soda free flux glass comprises a lead borosilicate glass. Preferably, the soda free flux glass comprises from 45 to 65 percent by weight lead, from 5 to 15 weight percent $B_2O_3$, and from 25 to 40 weight percent silica. Typically, the glass enamel composition is mixed with a carrier-binder comprised of oil and resins for application to the glass substrate.

DESCRIPTION OF THE PREFERRED EMBODIMENTS

A glass enamel, according to this invention, is prepared from a mixture of a soft flux glass and a hard flux glass. The compositions of these soda free flux glasses is as set forth below in weight percent:

| Component | Soft flux | Hard flux |
| --- | --- | --- |
| PbO | 55–65 | 45–55 |
| $B_2O_3$ | 5–10 | 5–10 |
| $SiO_2$ | 20–30 | 30–40 |
| Aluminum hydrate | 1 to 7 | 1 to 7 |
| Zircon | | 1 to 7 |

The components of the flux glasses were mixed and melted in a suitable furnace. The hard and soft flux glasses were then mixed together with a suitable ceramic pigment and ground to provide the non-metallic powdered ingredients of the glass enamel composition.

Two suitable glass enamel compositions in parts by weight were prepared as follows:

| Component | Black Enamel | Grey Enamel |
| --- | --- | --- |
| Hard flux | 45 | 45 |
| Soft flux | 35 | 35 |
| Zinc metal | 10 | 10 |
| Black oxide | 20 | 8 |
| Titanium oxide |  | 2 |
| Blue oxide |  | 3 |

Black oxide and blue oxide are coloring agents. These are powdered oxides that color the glass mixtures of which they are a part. A large number of coloring agents of widely varying composition are known to those skilled in the art.

Because automobile backlites are bent or pressed to different shapes, it is necessary to heat them to different temperatures for bending or pressing. This requires a different firing temperature for different glass enamels. By making the glass enamels from a mixture of hard and soft flux glasses the desired firing temperature can be obtained by changing the ratio of hard and soft flux glasses.

If a single flux glass is preferred, it may have the following composition in parts by weight.

| Component | Single flux |
| --- | --- |
| PbO | 55–65 |
| $SiO_2$ | 20–30 |
| $TiO_2$ | 1 to 7 |
| Zircon | 3 to 10 |
| Boric acid | 5–15 |

Lithium carbonate and potassium carbonate may be substituted for a portion of the boric acid in any flux glass used to practice this invention. These would supply lithium and potassium oxide to the glass enamel. The enamel must remain soda free, however. The conductive coatings are comprised of silver powder and/or silver flakes along with other noble metals. The presence of soda will destroy the inertness between the glass enamel and the conductive metal coating. The conductive coatings contain silver powder and silver flakes that enter a strong ion exchange reaction with soda. The silver ions appear to migrate into the glass enamel containing soda and the soda or sodium ions appears to migrate into the conductive coating. When the silver penetrates the glass enamel it produces the undesired discoloration in the glass enamels which is visible. It should not be lost sight of, however, that the soda free flux glasses and ceramic pigment systems alone would not provide the advantages of this invention. The presence of the metal, such as zinc, is also essential apparently for preventing silver migration and reaction with the glass enamel. The mechanism by which the metal in the glass flux blocks the silver from the glass enamel is simply not understood. Metals that have both high and low melting points appear to work equally well.

The composition of the conductive metal powders is not a feature of this invention. These are known in the prior art. Typically, they are comprised of finely divided conductive metals such as silver and palladium mixed with a glass binder.

Carriers and binders for the conductive composition and the glass enamel comprise oils and resins. A suitable carrier-binder for the ground glass enamel composition would comprise the following in parts by weight:

| Component | Amount |
| --- | --- |
| Pine oil | 175 |
| Ethyl Cellulose (N-22 viscosity) | 8 |
| Clean burning Thermoplastic resin | 5 |
| Hydrogenated methyl ester of abetic acid (rosin derivative) | 10 |
| Lecithin | 5 |

The carrier-binder may be added to the ground glass enamel composition in amounts up to 20 percent by weight to form an "ink" that may be applied to the substrate surface by a silk-screen or other printing process.

The typical application method is to apply by the silk-screen process the glass enamel composition on the glass substrate and to dry the glass enamel composition in an oven to set the resin and remove a portion of the oil. Then the conductive coating composition is applied by the silk-screen process upon the substrate abutting or overlapping the dried glass enamel composition. The conductive coating composition is dried. The substrate is passed through a furnace to fire both coatings to cause them to melt, mature and adhere to the substrate. The glass substrate will typically pass through the furnace in a matter of several (for example, 3 to 5) minutes and at a temperature of 1000 to 1300 degrees F (598 to 704 degrees C.). Under these conditions certain metal powders will not tend to oxidize. The presence of the easily oxidizable organic constituents of the carrier and binder may provide a somewhat reducing atmosphere in the vicinity of the powdered metals. It is expected that readily oxidizable metals such as aluminum and magnesium would not be sufficiently resistant to oxidation to be used as a metal powder in the glass enamel.

Having thus defined my invention with the detail and particularity required by the Patent Laws, what is claimed and desired to be protected by Letters Patents is set forth in the following claims.

I claim:

1. A method of decorating a glass substrate to serve as an electrically heated window that has conductive silver containing coatings applied thereto as electrically resistive heating elements comprising the steps for:
   (a) applying to said glass substrate a glass enamel composition comprising
      5 to 25 percent by weight glass coloring agents,
      8 to 15 percent by weight of a powdered metal all passing 325 mesh Tyler Series selected from the group consisting of zinc, tin, cadmium, manganese, iron, and mixtures and alloys thereof such that the glass enamel and the conductive coating do not visibly react upon firing and the conductive coating cannot be seen through the glass enamel, and the remainder a soda free flux glass,
   (b) drying or curing the glass enamel composition,
   (c) applying the conductive coating composition overlapping or touching the glass enamel comprising finely divided conductive noble metals including silver, and a glass binder, (d) drying the conductive coating composition, and (e) firing the substrate bearing the glass enamel composition and the conductive coating composition onto the substrate at temperatures at which the soda free flux glass in the glass enamel composition and the glass binder in the conductive composition soften and coalesce to cause the adherence of the glass enamel and the conductive coating upon the substrate.

2. A method of decorating a glass substrate to serve as an electrically heated window that has conductive coatings applied thereto as electrically resistive heating elements comprising the steps for:

(a) applying to said glass substrate a glass enamel composition comprising 5 to 25 percent by weight glass coloring agents, 8 to 15 percent by weight of a powdered metal all passing through 325 mesh Tyler Series selected from the group consisting of zinc, tin, cadmium, manganese, iron, and mixtures and alloys thereof such that the glass enamel and conductive coating do not visibly react upon firing and the conductive coating cannot be seen through the glass enamel, and the remainder a soda free flux glass, (b) applying the conductive coating composition overlapping or touching the glass enamel comprising finely divided conductive noble metals including silver, and a glass binder, an d (c) firing the glass enamel composition and the conductive coating composition onto the substrate at temperatures at which the soda free flux glass in the glass enamel composition and the glass binder in the conductive composition soften and coalesce to cause the adherence of the glass enamel and the conductive coating upon the substrate.

3. The method according to claim 1 or 2 wherein the metal in the glass enamel composition has an average particle size of less than 1 micron.

4. The method according to claims 1 or 2 wherein the soda free flux glass comprises a lead borosilicate glass.

5. The method according to claims 1 or 2 wherein the soda free flux glass comprises from 45 to 65 percent by weight lead, from 5 to 15 weight percent $B_2O_3$, and from 25 to 40 weight percent silica.

6. The method according to claims 1 or 2 wherein the glass composition is mixed with an organic binder carrier comprised of organic oil and resins for application to the glass substrate.

* * * * *

UNITED STATES PATENT AND TRADEMARK OFFICE
CERTIFICATE OF CORRECTION

PATENT NO. : 4,975,301

DATED : December 4, 1990

INVENTOR(S) : Ray Andrews and James W. Kridler

It is certified that error appears in the above-identified patent and that said Letters Patent is hereby corrected as shown below:

Claim 2 b) Line 7 Column 6 "an d" should read --and--.

Signed and Sealed this

Twenty-first Day of July, 1992

Attest:

DOUGLAS B. COMER

Attesting Officer

Acting Commissioner of Patents and Trademarks